United States Patent
Bomans et al.

(10) Patent No.: US 6,236,912 B1
(45) Date of Patent: May 22, 2001

(54) PROCESS AND DEVICE FOR AIDING AERIAL NAVIGATION, WITH DISPLAY OF NAVIGATION INSTRUMENTS USED

(75) Inventors: Muriel Bomans, Antony; Sylvie Grand-Perret, Marcoussis, both of (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/125,018

(22) PCT Filed: Jan. 21, 1997

(86) PCT No.: PCT/FR97/00117

§ 371 Date: Aug. 10, 1998

§ 102(e) Date: Aug. 10, 1998

(87) PCT Pub. No.: WO97/29346

PCT Pub. Date: Aug. 14, 1997

(30) Foreign Application Priority Data

Feb. 9, 1996 (FR) .................................................. 96 01623

(51) Int. Cl.⁷ ................................ G06F 7/00; G06G 7/76
(52) U.S. Cl. ............................... 701/3; 701/14; 701/120; 701/202; 244/75 R; 244/221; 345/357
(58) Field of Search ............................. 701/3, 4, 11, 13, 701/14, 120, 35, 29, 31, 34, 200, 202, 204, 206; 434/43, 42, 49; 244/181, 182, 183, 227, 76 A, 75 R, 220, 221; 714/46, 3, 31; 340/971, 973, 976, 980; 345/326, 333–335, 339, 348–349, 355–357

(56) References Cited

U.S. PATENT DOCUMENTS

| | | | |
|---|---|---|---|
| 4,283,705 | * | 8/1981 | James et al. ........................ 340/973 |
| 4,604,711 | * | 8/1986 | Benn et al. ............................. 701/14 |
| 4,692,869 | * | 9/1987 | King et al. ........................... 701/206 |
| 4,774,670 | * | 9/1988 | Palmieri .............................. 701/204 |
| 4,811,230 | * | 3/1989 | Graham et al. ........................ 701/16 |
| 5,023,791 | * | 6/1991 | Herzberg et al. ..................... 701/35 |
| 5,111,402 | * | 5/1992 | Brooks et al. ........................ 701/35 |
| 5,184,312 | * | 2/1993 | Ellis ..................................... 701/12 |
| 5,260,874 | * | 11/1993 | Berner et al. ......................... 701/14 |
| 6,112,140 | * | 8/2000 | Hayes et al. .......................... 701/14 |
| 6,112,141 | * | 8/2000 | Briffe et al. .......................... 701/14 |

* cited by examiner

Primary Examiner—Jacques H. Louis-Jacques
(74) Attorney, Agent, or Firm—Oblon, Spivak, McClelland, Maier & Neustadt, P.C.

(57) ABSTRACT

A process and device for assisting aerial navigation. The system affords the pilot of the aircraft greater knowledge regarding the situation which results from automatic decisions of a flight management system. A central zone is displayed on a viewing screen which represents the overall use of the navigation instruments. Peripheral zones of the screen represent the individual instruments with a visible plot of the relationship between the central zone and a particular peripheral zone when the latter corresponds to a navigation instrument actually being used. For example, the central zone is a disk whose diameter represents the mean error in position given by the use of the various instruments and the visible plots of relationship are color radial sectors which extend between the central zone and certain peripheral zones. The names of the instruments are indicated in the peripheral zones.

16 Claims, 6 Drawing Sheets

PROCESS AND DEVICE FOR AIDING AERIAL NAVIGATION, WITH DISPLAY OF NAVIGATION INSTRUMENTS USED

BACKGROUND OF THE INVENTION

1. Field of the Invention

The invention relates to processes and devices for assisting aerial navigation.

2. Discussion of the Background

In general, it is known that in aerodynes (aircraft, helicopters, etc.) of modern design, the pilot must carry out a dialogue with a flight management system, this being a computer on board the aerodyne (we shall subsequently speak of an aircraft) for assisting the pilot in a number of operations. These operations are mainly operations for defining the flight plan before take-off, piloting (manual or automatic) operations during take-off and landing, aerial navigation operations (path calculations, etc.), systematic monitoring operations while cruising or when approaching an airport.

The flight management system operates on the basis of data entered by the pilot, data supplied by sensors distributed throughout the aircraft, and possibly digital data transmitted by radio from the ground or from other aircraft or even satellites ("DATALINK" system which is undergoing generalization).

The dialogue between the flying crew and the flight management system is carried out mainly by means of at least three interfaces, viz.:

a navigation display on which is represented the plot of the desired course of the aircraft, that is to say a graphical two-dimensional representation of the flight plan of the aircraft and the situation of the aircraft within this plan;

a primary flight display which depicts an artificial horizon which tilts as the aircraft tilts, an indication of the longitudinal attitude of the aircraft, and other useful flying indications, in particular the mode of guidance of the aircraft;

a flight control unit having manual controls for selecting settings such as the desired heading of the aircraft;

and finally a keyboard/display console, termed the MCDU ("Multipurpose Control Display Unit"), this being a data display and input console allowing the flying crew to enter data into the flight management system and to read information forwarded by the flight management system on the basis of the data entered.

Among other things, it is the task of the flight management system to manage the navigation instruments used; certain navigation instruments may be used at a given time and others are used at other times. The navigation instruments are for example the inertial units (IRS), the satellite positioning receivers (GPS), and the radio navigation means (for example DME/DME or VOR/DME).

It is the flight management system FMS which itself chooses the navigation instruments to be used at a given time, depending on (fairly complex) rules of priority. If it uses radio navigation beacons, it chooses these beacons automatically. And it computes estimated errors in the positions delivered by the various navigation instruments, and a resultant mean error. If a navigation instrument gives a position indication which is too poor relative to the accuracy requested, the flight management system itself manages the change of instruments, via a change of navigation mode.

However, the pilot must be aware of the choices made automatically by the FMS system since, especially in the event of a problem, the system must not continue to manage an abnormal situation which the pilot would no longer have any knowledge of.

SUMMARY OF THE INVENTION

The invention aims to provide a means for aiding navigation which facilitates the pilot's overall intuitive acquisition of this information, either permanently or at the pilot's request, or else in the event of a problem detected by the flight management system.

Hence, proposed herein is a process for aiding aerial navigation, using a flight management system which carries out a dialogue with the pilot by means of several interfaces which include at least one display screen, the flight management system delivering information about the state of operation and the accuracy of the various aerial navigation tools present in an aircraft, which process is characterized in that it consists in simultaneously displaying on the screen a central zone representing the overall use of the tools and peripheral zones distributed around the central zone and each individually representing the use of a particular navigation tool, and in also displaying simultaneously a plot of relationship between the central zone and a peripheral zone if the latter corresponds to a tool which is actually used by the flight management system, so that the simultaneous displaying of these visible plots of relationships indicates the number of tools actually used by the flight management system, and the peripheral zones linked to the central zone by these plots indicate which are these actually used tools.

In an advantageous embodiment, the plots of relationship comprise a colored radial zone extending between the central zone and a peripheral zone distant from the central zone. The radial zone preferably has a triangular or frustoconical shape, narrowing towards the center of the central zone and becoming wider towards the outside. It can also have an arrow shape, pointing towards the central zone. The central zone can be circular and its diameter can represent an estimated value of mean error in position delivered by the instruments used. This error value is computed by the flight management system.

In another beneficial embodiment, the visible plots of relationship comprise a display of a peripheral zone in direct contact with the central zone, and a coloured zone in a portion of the central zone adjacent to the said peripheral zone, so that it is immediately possible to identify on the one hand those tools which are used and on the other hand those tools which are not used. The peripheral zones corresponding to navigation instruments which are used can comprise the name (abbreviated) of these instruments, surrounded by a frame. The frame can in this case touch the central zone. The central zone can be of polygonal shape, the number of vertices being equal to the number of tools which must necessarily be operating during a current flight phase, and the whole of the central zone is colored if all the necessary tools are being used.

The invention also relates to a device allowing the implementation of the process according to the invention.

The invention therefore proposes a device for aiding aerial navigation, using a flight management system which carries out a dialogue with the pilot by means of several interfaces which include at least one display screen, the flight management system delivering information about the state of operation and the accuracy of the various aerial navigation tools present in an aircraft, characterized in that means are provided for simultaneously displaying on the screen a central zone representing the overall use of the tools and peripheral zones distributed around the central zone and each individually representing the use of a particular navigation tool, and also for simultaneously displaying a plot of relationship between the central zone and a peripheral zone if the latter corresponds to a tool which is actually used by the flight management system, so that the simultaneous displaying of these visible plots of relationships indicates the number of tools actually used by the flight management system, and the peripheral zones linked to the central zone by these plots indicate which are these actually used tools.

The means provided are such that the zones associated with tools which are in a satisfactory state of operation are represented differently from the zones associated with tools which cannot operate correctly, correct or incorrect operation being determined by the flight management system.

In an advantageous embodiment, the screen is a screen of a data display and input console allowing the selection of specified zones of the screen for the execution of operations related to these zones; the peripheral zones can be selected and means are provided for displaying data on the screen which pertain to the navigation tool corresponding to a peripheral zone when this zone is selected.

Finally, in the event that the flight management system detects that the number of navigation tools which are actually usable is less than that which would theoretically be necessary having regard to the current flight phase, the system displays the relationships between central zone and peripheral zones in a specific color which attracts the pilot's attention to the abnormal nature of the situation.

BRIEF DESCRIPTION OF THE DRAWINGS

Other characteristics and advantages of the invention will emerge on reading the following detailed description which is given with reference to the appended drawings in which.

DETAILED DESCRIPTION OF THE PREFERRED EMBODIMENTS

Figure 1:
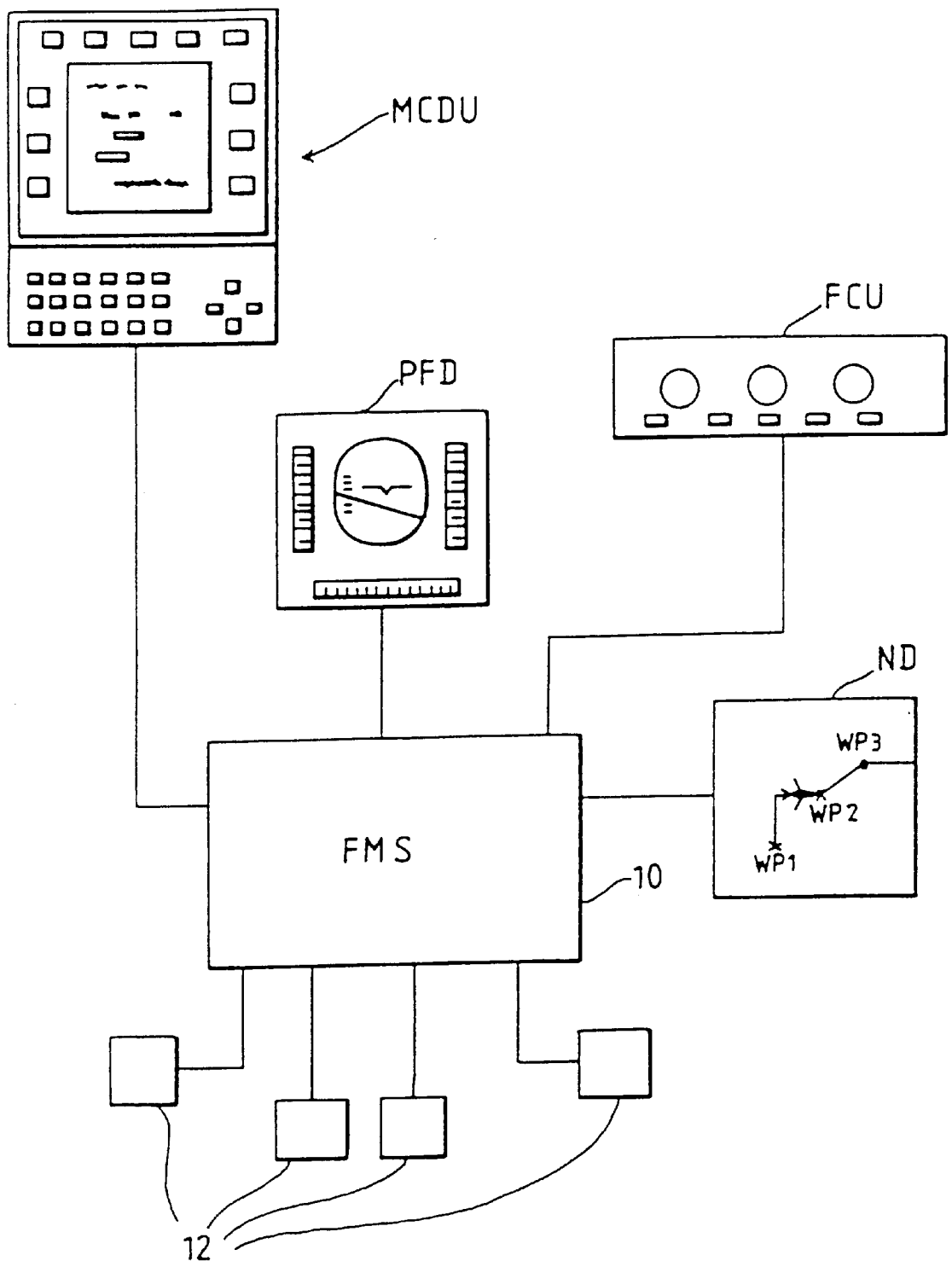
FIG. 1 represents the whole of the device for aiding navigation according to the invention.
Figure 2:
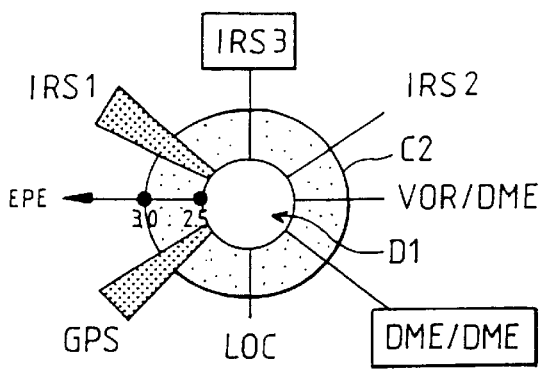
FIGS. 2 to 9 represent the screen image displayed in a first embodiment of the invention, for various situations.
Figure 3:
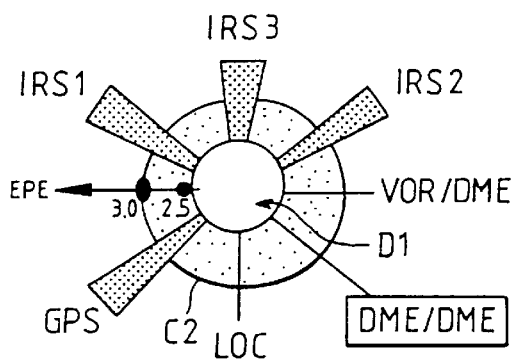
Figure 4:
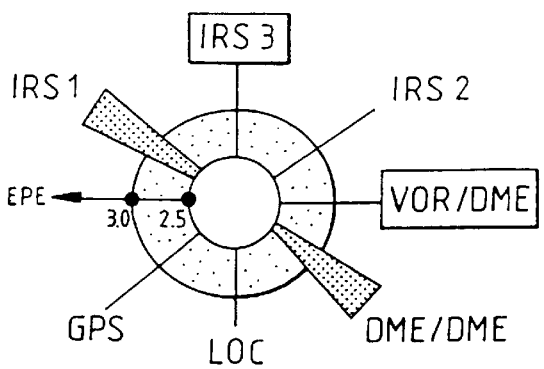
Figure 5:
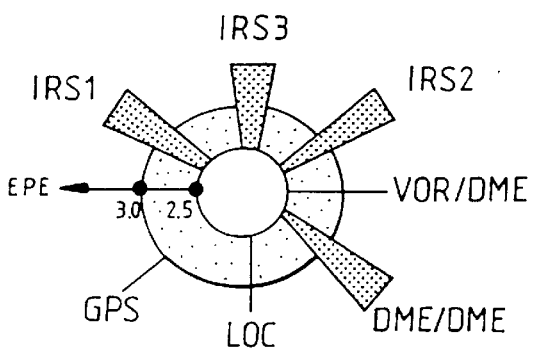
Figure 6:
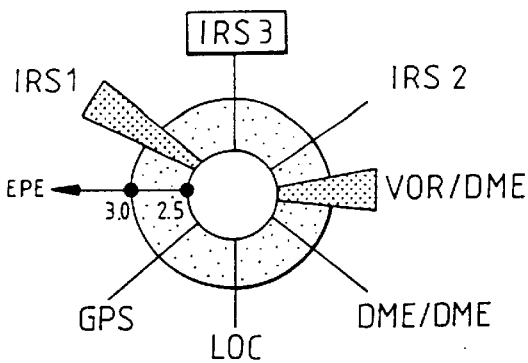
Figure 7:
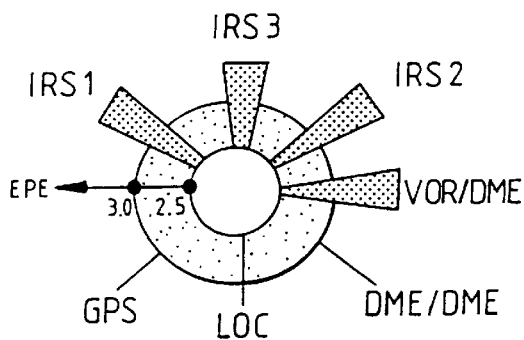
Figure 8:
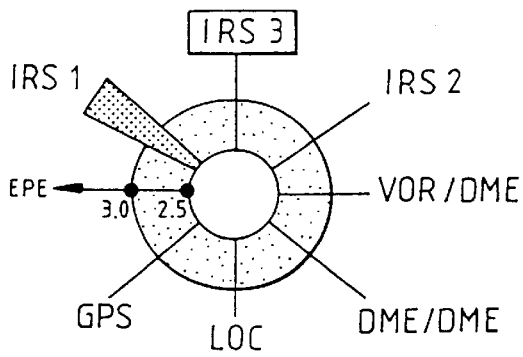
Figure 9:
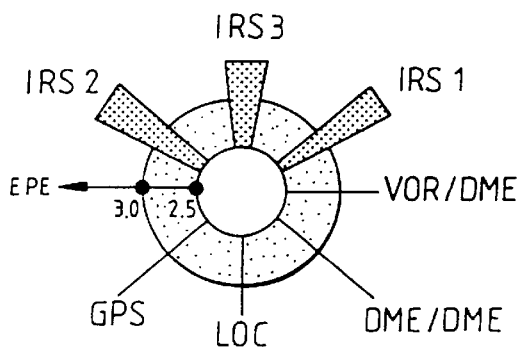

The device for aiding navigation according to the invention constitutes a part of an overall aircraft monitoring system. This overall system, represented in FIG. 1, essentially comprises:

the flight management system or FMS, this being a computer 10 which can receive various information, can calculate other information and can forward it to the pilot by means of dialogue interfaces;

sensors 12 distributed throughout the aircraft, including for example navigation instruments (IRS inertial units, etc.), various sensors giving information about the state of the aircraft, optionally instruments for communicating with the outside, all of these sensors being linked to the flight management system;

the interfaces for carrying out a dialogue with the pilot, which are linked to the computer 10, and which will mainly include:

a flight control unit or FCU which makes it possible, with the aid of buttons, to select for example the heading of the aircraft, or other settings which have to be supplied to the management system;

a screen for displaying navigation information, ND ("Navigation Display"), for displaying maps, flight plans, etc., a primary flight display PFD for displaying an artificial horizon, altitudes of the aircraft, attitudes, velocity vectors, an indication of guidance mode ("Flight Mode Annunciator"), etc., a data display and input console or MCDU ("Multipurpose Control Display Unit").

The indications of operation of the various navigation instruments used by the flight management system can be displayed on a screen of the MCDU type or optionally on the navigation display ND, when requested by the pilot (via an appropriate function key), or automatically in the event of a problem.

In a first embodiment, the displays which the system exhibits on the screen are like those of FIGS. 2 to 9. These figures represent examples for particular configurational cases detected by the flight management system, and the principles of the display effected in the general case will be explained in detail.

The system displays a central zone which consists of a disk D1 whose diameter is a measure of the mean position error estimated by the computer as a function of the navigation instruments available to it and whose individual accuracies it has computed; the greater the accuracy, the smaller the diameter of the disk D1.

This central zone therefore represents as it were the overall operation of the navigation instruments used, and its dimension represents the mean accuracy obtained by these instruments.

It is also possible to represent, if so desired, a circle C2 concentric with the disk D1, the diameter of this circle being the maximum allowable mean position error for correct operation of the system.

The disk D1 is therefore of smaller diameter than the circle C2 in the normal case, and has diameter identical to that of the circle C2 in an abnormal case.

The disk D1 can be colored green in the case of a normal situation (green disk D1 inside the circle C2 which can be a red line). And it is also possible to provide for the disk D1 to change background color (red coloration for example) if its diameter becomes equal to that of the circle C2. The pilot thus has an intuitive overall visual indication of a normal situation and of an abnormal situation. FIGS. 2 to 9 are sketched in the case of a situation of normal accuracy.

An estimated value of the position error can be represented on the screen; it is designated by the letters EPE in FIGS. 2 to 9.

The use of the various navigation instruments is represented by peripheral zones provided around the central zone. The simplest is that each zone includes a clear literal entry (in practice abbreviated to a few letters) for a specified navigation instrument.

In the case of FIGS. 2 to 9, there are 7 possible navigation tools, namely three inertial units IRS1, IRS2, IRS3, a GPS receiver and radio navigation means VOR/DME, DME/DME, LOC. All of the means which are apt to be used during the current flight phase are displayed.

If the flight management system is actually using a tool, it displays a plot of relationship between the central zone D1 and the peripheral zone corresponding to the means used. This plot extends radially between the central zone and the relevant peripheral zone. Here, the plot is an isosceles trapezium (or triangle) having two equal lateral sides extending substantially radially and two unequal parallel sides, the small side being directed towards the central zone and the large side being directed towards the relevant peripheral zone. The plot of relationship can also be a radial arrow pointing from the means of the peripheral zone to the center of the central zone, or possibly pointing in the opposite direction, that is to say towards the peripheral zone corresponding to a navigation means being used. The plots of relationship (triangle or trapezium or arrow, etc.) are of a color which stands out clearly from the background of the screen and from the annulus between the disk D1 and the circle C2.

The overall image displayed is as it were that of a flower with radial petals. There are as many petals as navigation tools being used and the pilot can ascertain at a glance whether the number of tools being used is normal. The number of petals of the flower represents an estimate of the security of navigation.

The other peripheral zones, which would be situated at the end of a radial plot if the corresponding navigation tool were being used, can be distinguished depending on whether or not the tool to which they correspond is valid (although not being used). In the example represented, the valid tools which are not being used are framed and the others are not (or vice versa). The tools being used, at the end of a radial plot, are necessarily valid; consequently, it is not necessary to confer any particular mark on them. Nevertheless, they can also be framed so as not to have the visual impression that an invalid tool is being used.

The various FIGS. 2 to 9 represent possible configurations of the screen for various usage of tools. They are given by way of example and correspond to the explanations given above.

If the screen used is interactive, that is to say if the user can designate a zone of the screen in order to trigger an action corresponding to this zone, the following enhancement may be made: the designating of a specified peripheral zone causes particular characteristics to be displayed on the screen which correspond to the navigation tool thus designated. The pilot: can thus gather more accurate information about the various tools which are or are not being used.

FIGS. 10 to 17 represent another embodiment, in which again there are particular plots of relationship between the central zone and a peripheral zone corresponding to a navigation instrument being used and this time in which:

the central zone is polygonal in shape;

the plots of relationship between the central zone and a peripheral zone comprise two elements:

a colored zone in a strip touching the peripheral zone, this colored zone having a span such that if two navigation instruments are being used, the two corresponding peripheral zones are linked by a continuous colored strip. The term "colored zone" is understood to mean a zone of a color which differs from the background, even if this color is white or black;

and a frame of the peripheral zone corresponding to a tool being used, this frame adjoining, preferably immediately, the polygon of the central zone and therefore adjoining the associated colored background. The abbreviated name of the tool is entered inside this frame.

The unused tools appear not linked to the polygonal zone and especially not adjacent to the coloured zones of the polygonal zone.

The unused tools which are however valid can appear in framed form, whereas the unused tools which are not valid have no frame.

Figure 10:
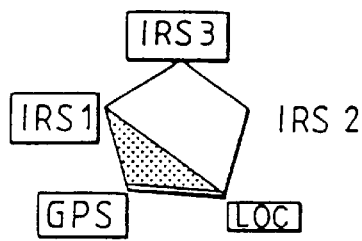
FIGS. 10 to 17 represent the image displayed in a second embodiment.
Figure 11:
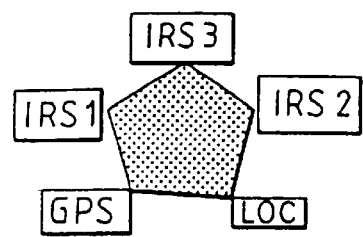
Figure 12:
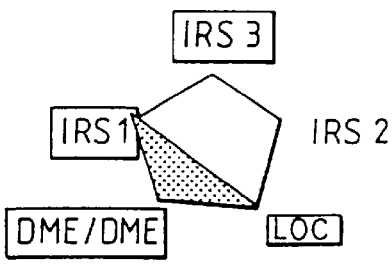
Figure 13:
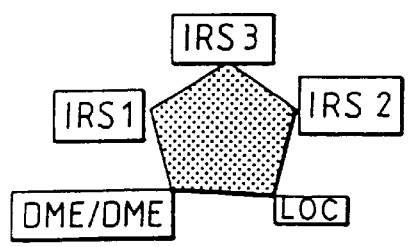
Figure 14:
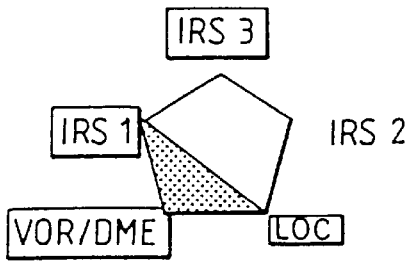
Figure 15:
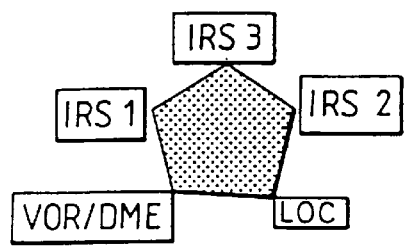
Figure 16:
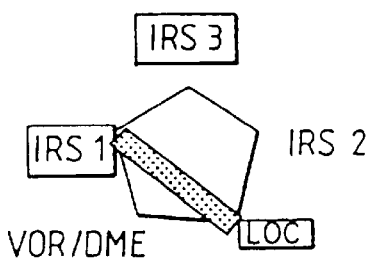
Figure 17:
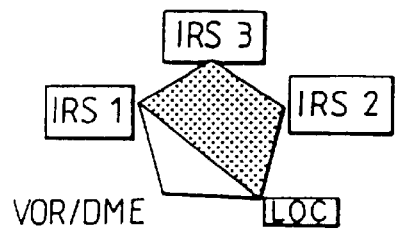
Figure 18:
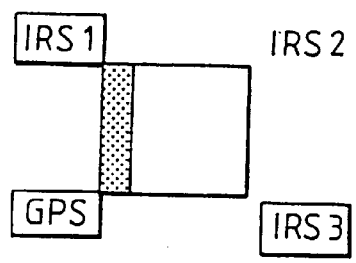
FIGS. 18 to 25 represent an image displayed in another case, still with the second embodiment.
Figure 19:
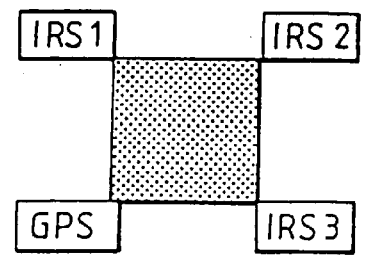
Figure 20:
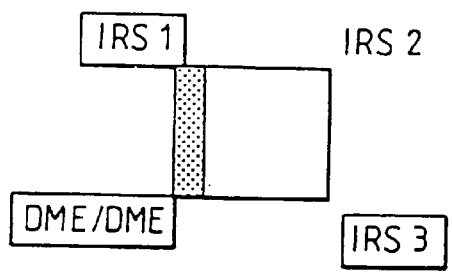
Figure 21:
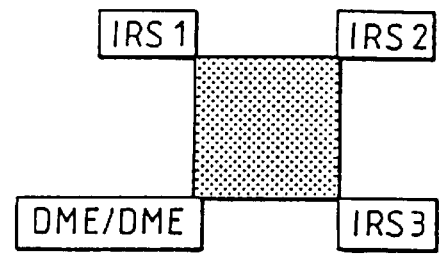
Figure 22:
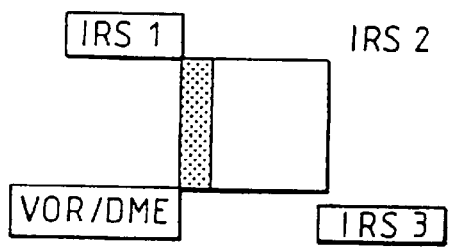
Figure 23:
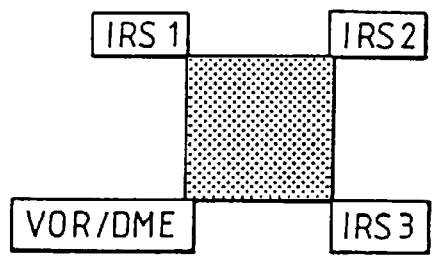
Figure 24:
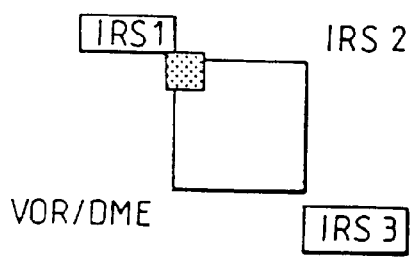
Figure 25:
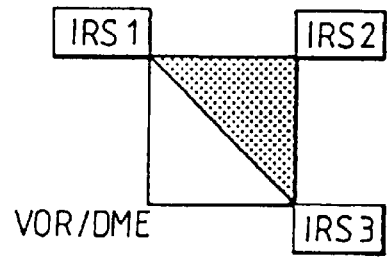

In this embodiment, there is provision for the number of vertices of the central polygon to be equal to the number of navigation tools which are to be used during the flight phase if operation is normal. This means that if operation is normal the whole of the central polygonal zone should appear colored (FIGS. 11, 13, 15). In the case of FIGS. 10 to 17, it should have 5 navigation tools at the same time. If a smaller colored polygon appears (triangle: FIGS. 10, 12, 14; trapezium FIG. 17; simple strip FIG. 16), then there is an abnormal situation. The pilot can detect it very easily according to the shape and area of the central colored zone. He then has details by observing which names of navigation instruments appear in the peripheral zones. Here again, he may have more details by selecting a desired peripheral zone if he possesses means of interactivity with the screen.

FIGS. 18 to 25 represent a display in the same embodiment, but during a flight phase in which the number of navigation tools which are to be in service is only four.

In FIGS. 10 to 17 and 18 to 25 it is desirable for a measure of the error in mean position delivered by the instruments, and a measure of the maximum tolerable error during the relevant flight phase to appear in one part of the screen, in one form or another (concentric circles, graduated scale, etc.). This measure has not been represented in the figures.

In these figures also it should be pointed out that the name of the tools which is displayed in the peripheral zones can vary over time. This is because the flight management system does not display all the available tools (as was the case for FIGS. 2 to 9) but only a limited number of tools. Thus, FIG. 11 represents a normal configuration using the tools IRS1, IRS2, IRS3, GPS and LOC, whereas FIG. 13 represents a likewise normal configuration which is however using the DME/DME tool rather than GPS. The same holds for FIGS. 19 and 21.

Figure 26:
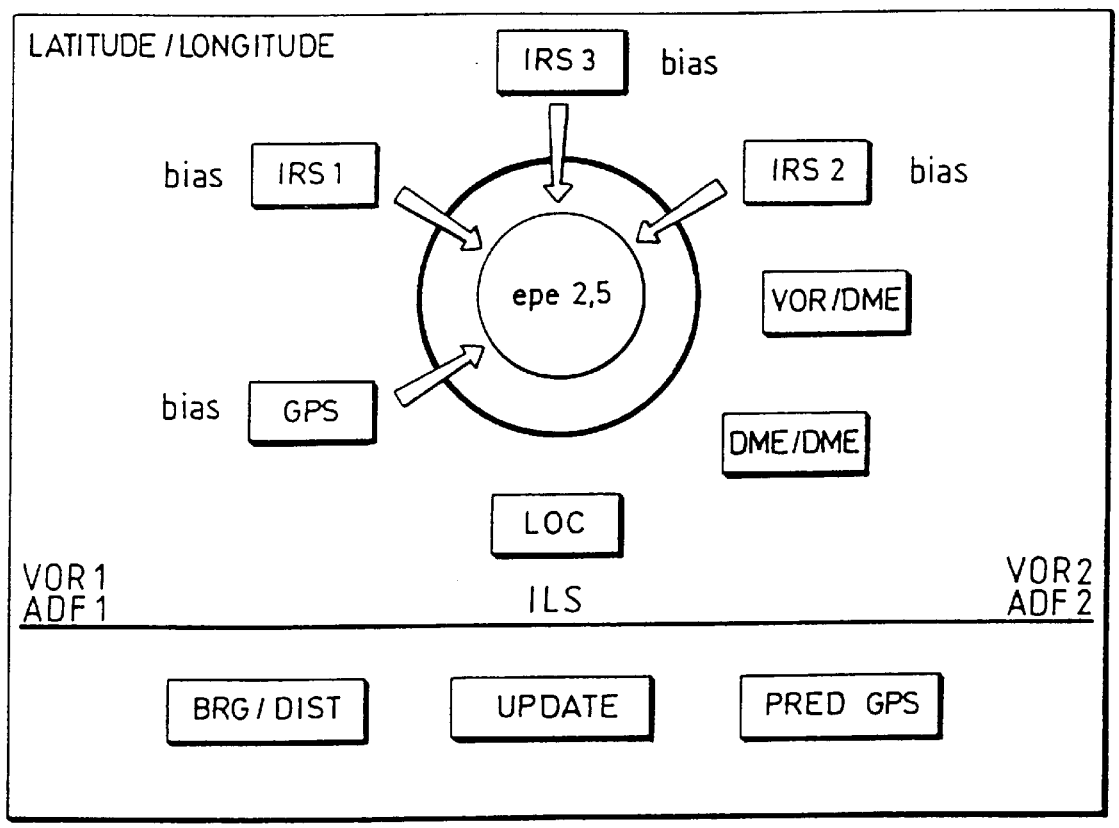
FIG. 26 represents an example of a more detailed image.

FIG. 26 represents a realistic configuration of a screen for aiding navigation operating according to the principle of the invention. The peripheral zone is a green disk. The current position error indication epe 2.5, is given in the center of this disk. The diameter of this disk is proportional to the indication epe. A red circle C2 of diameter corresponding to the maximum allowable position error surrounds the green disk D1. The radial zones are arrows directed towards the center of the disk D1. The peripheral zones are rectangles containing an entry corresponding to a navigation tool; they have the form of selection buttons (which may be "clicked" on to obtain further information about the corresponding tool). There are no arrows for the unused tools. Further indications, outside the central zone and the peripheral zones, relate to the existence of currently unusable navigation means (VOR1, ADF1, ILS, VOR2 ADF2 in the example of FIG. 26). Finally, other selection buttons (BRG/DIST, UPDATE, PRED GPS) make it possible to obtain other information again pertaining to navigation or to update the information.

What is claimed is:

1. Process for aiding aerial navigation of an aircraft having a flight management system carrying out a dialogue with the pilot by means of several interfaces including at least one display screen, said process comprising:

simultaneously displaying on the display screen a central zone indicating an operational state of aircraft navigation relative to a plurality of navigation tools available on the aircraft and peripheral zones distributed around the central zone, wherein each peripheral zone is associated with one of the navigation tools available for use on the aircraft and the display of the peripheral zones indicates if the associated navigation tool is actually used by the flight management system in navigating the aircraft; and displaying the peripheral zone associated with at least any of the navigation tools actually being used linked to the central zone by a linking plot.

2. Process according to claim 1, wherein the process further comprises displaying each linking plot as a colored radial zone extending between the central zone and the peripheral zone.

3. Process according to claim 2, wherein the process further comprises displaying the radial zone as a triangular or frustoconical shape that narrows towards the central zone and becoming wider towards the peripheral zone.

4. Process according to claim 3, wherein the process further comprises displaying the central zone as a disk with a diameter having a value that represents an estimated value of mean error in position based upon the navigation tools used and error calculated by the flight management system.

5. Process according to claim 2, wherein the process further comprises displaying the radial zone as an arrow shape.

6. Process according to claim 5, wherein the process further comprises displaying the central zone as a disk with a diameter having a value that represents an estimated value of mean error in position based upon the navigation tools used and error calculated by the flight management system.

7. Process according to claim 2, wherein the process further comprises displaying the central zone as a disk with a diameter having value that represents an estimated value of mean error in position based upon the navigation tools used and error calculated by the flight management system.

8. Process according to claim 1, wherein the process further comprises displaying the central zone as a disk with a diameter that has a value that represents an estimated value of mean error in position based upon the navigation tools and associated error calculated by the flight management system being used.

9. Process according to claim 8, wherein the process further comprises displaying a circular line around the disk, the circular line having a diameter that has a value that represents a maximum acceptable mean position error.

10. Process according to claim 1, wherein the process further comprises displaying the peripheral zone in direct contact with the central zone as the linking plot and a colored portion of the central zone adjacent to the peripheral zone so it is immediately evident the navigation tools being used and the navigation tools which are not used.

11. Process according to claim 10, wherein the process further comprises displaying the central zone as a polygon having a number of vertices equal to a number of navigation tools which are theoretically necessary in a current flight phase, and wherein the entire polygon is colored if the system actually uses all of theoretically necessary navigation tools.

12. Process according to claim 11, wherein the process further comprises displaying a peripheral zone corresponding to a navigation tool recognized as valid by the flight management system but which is not currently being used by the flight management system as at least a frame.

13. Device for aiding aerial navigation of an aircraft having a flight management system configured to perform a dialogue with the pilot by means of several interfaces including at least one display screen, said device further comprising:

a control portion configured to provide simultaneous display on the display screen of a central zone indicating an operational state of the flight management system as determined by the flight management system relative to the plurality of navigation tools available on the aircraft and actually used to navigate the aircraft, peripheral zones distributed around the central zone, and linking plots between the central zone and particular ones of the peripheral zones representing the actual use of a particular navigation tool by the flight management system as to the particular linked peripheral zone, so that the simultaneous displaying of the central zone and associated peripheral zones with linking plots indicates the navigation tools actually used by the flight management system.

14. Device according to claim 13, wherein the display screen is a screen associated with an input console configured to allow selection of specified zones of the screen for the execution of operations related to these zones, and separate control elements are provided and configured to control data display on the screen pertaining to the navigation tool corresponding to a particular peripheral zone when the particular peripheral zone is selected.

15. Device according to claim 14, wherein the separate control elements are also configured to control display of the peripheral zones associated with the navigation tools in a satisfactory state of operation differently from the peripheral zones associated with the navigation tools which cannot operate correctly.

16. Device according to claim 13, wherein the separate control elements are also configured to control display of the peripheral zones associated with the navigation tools in a satisfactory state of operation differently from the peripheral zones associated with the navigation tools which cannot operate correctly.

* * * * *